(12) United States Patent
Jang et al.

(10) Patent No.: US 8,343,652 B2
(45) Date of Patent: Jan. 1, 2013

(54) BATTERY CELL AND CASE WITH CORRESPONDING SMALL GROOVES

(75) Inventors: Jun Hwan Jang, Seoul (KR); Byungjin Choi, Daejeon (KR); Hyang Mok Lee, Seoul (KR)

(73) Assignee: LG Chem, Ltd. (KR)

( * ) Notice: Subject to any disclaimer, the term of this patent is extended or adjusted under 35 U.S.C. 154(b) by 1025 days.

(21) Appl. No.: 11/776,111

(22) Filed: Jul. 11, 2007

(65) Prior Publication Data

US 2008/0057384 A1    Mar. 6, 2008

(30) Foreign Application Priority Data

Sep. 4, 2006    (KR) .......................... 10-2006-0084459

(51) Int. Cl.
*H01M 2/02* (2006.01)
(52) U.S. Cl. .......................... 429/163; 429/176; 429/138
(58) Field of Classification Search ........... 429/129–147
See application file for complete search history.

(56) References Cited

U.S. PATENT DOCUMENTS

| | | | |
|---|---|---|---|
| 6,344,292 B1 * | 2/2002 | Nemoto et al. | 429/56 |
| 6,451,476 B1 | 9/2002 | Chang et al. | |
| 6,838,206 B2 * | 1/2005 | Kim et al. | 429/56 |
| 2001/0051297 A1 * | 12/2001 | Nemoto et al. | 429/129 |
| 2002/0182494 A1 * | 12/2002 | Hayashi et al. | 429/185 |
| 2003/0049527 A1 * | 3/2003 | Yageta et al. | 429/179 |
| 2004/0234848 A1 | 11/2004 | Chung et al. | |

FOREIGN PATENT DOCUMENTS

| | | | |
|---|---|---|---|
| JP | 58051461 A | | 3/1983 |
| JP | 61024144 A | | 2/1986 |
| JP | 11067276 A | | 3/1999 |
| JP | 11144691 A | | 5/1999 |
| JP | 11167913 | | 6/1999 |
| JP | 2000-200584 A | | 7/2000 |
| JP | 2001-057179 | | 2/2001 |
| JP | 2003288883 A | | 10/2003 |
| JP | 2004199995 A | | 7/2004 |
| JP | 2005-108747 | | 4/2005 |
| KR | 10-2001-0082058 | | 8/2001 |
| KR | 10-2001-0082059 | | 8/2001 |
| KR | 10-2001-0082060 | | 8/2001 |
| KR | 10-2007-0056494 | * | 6/2007 |
| KR | 20070056494 (A) | * | 6/2007 |

* cited by examiner

*Primary Examiner* — Keith Walker
(74) *Attorney, Agent, or Firm* — Lerner, David, Littenberg, Krumholz & Mentlik, LLP

(57) ABSTRACT

Disclosed herein is a battery cell including an electrode assembly of a cathode/separator/anode structure mounted in a receiving part of a battery case (cell case). The cell case is provided, at a predetermined region of the cell case corresponding to the upper end interface of the electrode assembly while the electrode assembly is mounted in the receiving part, with a small groove for pressing against the upper end of the electrode assembly to prevent the upward movement of the electrode assembly. The small groove is continuously formed in parallel with the upper end of the electrode assembly.

5 Claims, 7 Drawing Sheets

BATTERY CELL AND CASE WITH CORRESPONDING SMALL GROOVES

FIELD OF THE INVENTION

The present invention relates to a battery cell including an electrode assembly of a cathode/separator/anode structure mounted in a receiving part of a battery case (cell case), and, more particularly, to a battery cell constructed in a structure in which the cell case is provided, at a predetermined region of the cell case corresponding to the upper end interface of the electrode assembly while the electrode assembly is mounted in the receiving part, with a small groove for pressing against the upper end of the electrode assembly to prevent the upward movement of the electrode assembly, and the small groove is continuously formed in parallel with the upper end of the electrode assembly.

BACKGROUND OF THE INVENTION

As mobile devices have been increasingly developed, and the demand for such mobile devices has increased, the demand for batteries has also sharply increased as an energy source for the mobile devices. Also, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and anodes are wound while separators are disposed respectively between the cathodes and the anodes, a stacking type structure in which pluralities of cathodes and anodes having a predetermined size are successively stacked one on another while separators are disposed respectively between the cathodes and the anodes, or a stacking/folding type structure in which pluralities of cathodes and anodes having a predetermined size are successively stacked one on another while separators are disposed respectively between the cathodes and the anodes to constitute a bi-cell or a full-cell, and then the bi-cell or the full-cell is wound.

Recently, much interest has been taken in a pouch-shaped battery constructed in a structure in which such a stacking or stacking/folding type electrode assembly is mounted in a pouch-shaped battery case made of an aluminum laminate sheet because of low manufacturing costs, light weight, and easy modification in shape. As a result, the use of the pouch-shaped battery has gradually increased.

FIG. 1 is an exploded perspective view typically illustrating the general structure of a conventional representative pouch-shaped secondary battery 10.

Referring to FIG. 1, the pouch-shaped secondary battery 10 includes an electrode assembly 30, pluralities of electrode taps 40 and 50 extending from the electrode assembly 30, electrode leads 60 and 70 welded to the electrode taps 40 and 50, respectively, and a battery case 20 for receiving the electrode assembly 30.

The electrode assembly 30 is a power generating element comprising cathodes and anodes successively stacked one on another while separators are disposed respectively between the cathodes and the anodes. The electrode assembly 30 is constructed in a stacking structure or a stacking/folding structure. The electrode taps 40 and 50 extend from corresponding electrode plates of the electrode assembly 30. The electrode leads 60 and 70 are electrically connected to the electrode taps 40 and 50 extending from the corresponding electrode plates of the electrode assembly 30, respectively, for example, by welding. The electrode leads 60 and 70 are partially exposed to the outside of the battery case 20. To the upper and lower surfaces of the electrode leads 60 and 70 is partially attached insulative film 80 for improving sealability between the battery case 20 and the electrode leads 60 and 70 and, at the same time, for securing electrical insulation between the battery case 20 and the electrode leads 60 and 70.

The battery case 20 is made of an aluminum laminate sheet. The battery case 20 has a space defined therein for receiving the electrode assembly 30. The battery case 20 is formed generally in the shape of a pouch. In the case that the electrode assembly 30 is a stacking type electrode assembly as shown in FIG. 1, the inner upper end of the battery case 20 is spaced apart from the electrode assembly 30 such that the plurality of cathode taps 40 and the plurality of anode taps 50 can be coupled to the electrode leads 60 and 70, respectively.

FIG. 2 is an enlarged view, in section, illustrating the inner upper end of the battery case of the secondary battery shown in FIG. 1, in which the cathode taps are coupled to each other in a concentrated state and connected to the cathode lead, and FIG. 3 is a front see-through view illustrating the secondary battery of FIG. 1 in an assembled state.

Referring to these drawings, the plurality of cathode taps 40, which extend from cathode collectors 41 of the electrode assembly 30, are connected to one end of the cathode lead 60, for example, in the form of a welded bunch constituted by integrally combining the cathode taps 40 with each other by welding. The cathode lead 60 is sealed by the battery case 20 while the other end 61 of the cathode lead 60 is exposed to the outside of the battery case 20. Since the plurality of cathode taps 40 are integrally combined with each other to constitute the welded bunch, the inner upper end of the battery case 20 is spaced a predetermined distance from the upper end surface of the electrode assembly 30, and the cathode taps 40 combined in the form of the welded bunch are bent approximately in the shape of V. Accordingly, the coupling regions between the electrode taps and the corresponding electrode leads may be referred to as "V-form regions."

However, such V-form regions have a problem in the aspect of safety of the battery. When the battery drops with the upper end of the battery, i.e., the cathode lead 60 of the battery, down, or an external physical force is applied to the upper end of the battery, the electrode assembly 30 moves toward the inner upper end of the battery case 20, or the upper end of the battery case 20 is crushed. As a result, the anode of the electrode assembly 30 is brought into contact with the cathode taps 42 or the cathode lead 60, and therefore, short circuits may occur inside the battery. Consequently, the safety of the battery is greatly lowered.

Accordingly, there has been proposed a secondary battery constructed in a structure in which a predetermined region of the battery case corresponding to the upper end interface of the electrode assembly in the battery is modified into a specific form according to the present invention as a solution of fundamentally solving the above-mentioned problem.

In this connection, there has been known some technologies for forming a groove in one surface of the battery case. As an example, Japanese Patent Registration No. 3730981 discloses a secondary battery constructed in a structure in which a plurality of convex parts are formed at at least one surface of the battery case surrounding the electrode assembly to improve heat dissipation, and the convex parts are filled with fillers. This technology has an advantage in that the film surface area of the battery case is increased by the plurality of convex parts with the result that the heat dissipation is increased, and the shape of the convex parts is stably maintained by the fillers in the convex parts. However, it is not possible to prevent the occurrence of an internal short circuit of the battery due to the upward movement of the electrode assembly when an external force is applied to the electrode taps of the electrode assembly.

As another example, Japanese Patent Application Publication No. 2001-057179 a secondary battery constructed in a structure in which grooves or convex parts are formed at at least one surface of the battery case in the form of an X-shape linear pattern so as to restrain the expansion of the battery case and thus prevent the deformation of the battery case. As clearly described in the specification of the publication, the intersecting lines structurally serve as crossbeams to increase the total strength of the battery case, thereby prevent the deformation of the battery case due to the expansion of the battery case. However, this technology has a problem in that a desired effect is accomplished only when the linear pattern is formed in the X shape. Also, this technology has another problem in that a desired effect is accomplished only when the battery case is a metal container, and therefore, satisfactory results are not obtained when the battery case is a sheet-type battery case. In addition, it is required that the linear pattern be formed very deeply so as to structurally accomplish the crossbeam effect. However, this process may greatly deteriorate the mechanical strength of the battery case at the intersection region of the lines.

Consequently, there is high necessity for a technology that is capable of preventing the occurrence of a short circuit of the secondary battery due to the movement of the electrode assembly without difficulty in a manufacturing process.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when a small groove is formed in a predetermined region of a cell case corresponding to the interface between the upper end of an electrode assembly and electrode taps such that the small groove is continuously formed in parallel with the upper end of the electrode assembly, it is possible to prevent the upward movement of the electrode assembly and to prevent the occurrence of an internal short circuit due to external impact, such as dropping, without difficulty in a manufacturing process, thereby improving the safety of a battery cell. The present invention has been completed based on these findings.

In accordance with one aspect of the present invention, the above and other objects can be accomplished by the provision of a battery cell including an electrode assembly of a cathode/separator/anode structure mounted in a receiving part of a battery case (cell case), wherein the cell case is provided, at a predetermined region of the cell case corresponding to the upper end interface of the electrode assembly while the electrode assembly is mounted in the receiving part, with a small groove for pressing against the upper end of the electrode assembly to prevent the upward movement of the electrode assembly, the small groove being continuously formed in parallel with the upper end of the electrode assembly.

The occurrence of an internal short circuit of the battery due to dropping of the battery or application of an external force to the battery may act as a principal factor of explosion or combustion of the battery. This is because, when the battery drops or an external force is applied to the battery, the electrode assembly moves, and therefore, the cathodes and the anodes are brought into contact with each other. High resistance heat is generated due to conducting current in the contact resistance parts. When the interior temperature of the battery exceeds a critical temperature level due to the high resistance heat, the oxide structure of a cathode active material is collapsed, and therefore, a thermal runaway phenomenon occurs. As a result, the battery may catch fire or explode.

In the battery cell according to the present invention, on the other hand, the electrode assembly is mounted in the cell case while the electrode assembly is stably maintained in position by virtue of the small groove formed at the predetermined region of the cell case. Consequently, when the battery drops or when an external force is applied to the battery, the small groove restrains the upward movement of the electrode taps in the cell case to prevent the occurrence of the internal short circuit of the battery, whereby the safety of the battery is improved.

Furthermore, the small groove presses against the upper end of the electrode assembly at the predetermined region of the cell case corresponding to the interface between the electrode taps and the electrode assembly. Consequently, it is possible to effectively utilize a region that does not contribute to the capacity and operation of the battery.

Also, the small groove is continuously formed in the predetermined region of the cell case corresponding to the interface between the electrode taps and the electrode assembly such that the small groove is in parallel with the upper end of the electrode assembly. Consequently, the small groove is more easily formed at the cell case than the convex parts are formed at the outer surface of the battery case or the convex parts are modified into the linear pattern, as previously described.

According to circumstances, the cell case may be also provided, at a predetermined region of the cell case corresponding to the lower end interface of the electrode assembly while the electrode assembly is mounted in the receiving part, with another small groove such that the small groove is continuously formed in parallel with the lower end of the electrode assembly. In this case, the electrode assembly is more stably fixed in the battery case through the cooperation of the upper-end small groove and the lower-end small groove. Specifically, the small grooves are formed at the upper and lower end interfaces of the electrode assembly such that the electrode assembly is stably fixed in the receiving part of the cell case, whereby it is possible to considerably lower a possibility that the electrode assembly moves due to external impact applied to the battery or the dropping of the battery.

The electrode assembly is not particularly restricted so long as the electrode assembly is constructed in a structure in which a plurality of electrode taps are connected with each other to constitute cathodes and anodes. Preferably, the electrode assembly is constructed in a stacking or stacking/folding type structure. The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth herein.

The depth of the small groove according to the present invention is not particularly restricted so long as the small groove is formed in a predetermined region of the cell case corresponding to the interface between the electrode taps and the electrode assembly. Preferably, the small groove has a depth of 0.5 to 1.5 mm.

When the depth of the small groove is less than 0.5 mm, it is difficult to prevent the upward movement of the electrode assembly. When the depth of the small groove is greater than 1.5 mm, on the other hand, the battery case may break during the formation of the small groove in the battery case.

In a preferred embodiment, the small groove is constructed in a semicircular depression structure in vertical section. The small groove of the semicircular depression structure restrains the breakage of the battery case during the formation of the small groove in the battery case. Also, the small groove structurally has high shape retention. Preferably, the small groove of the semicircular depression structure has a radius of curvature R of 0.3 to 3 mm.

In the battery cell according to the present invention, the cell case is preferably made of a laminate sheet including a resin layer and a metal layer. Specifically, the cell case may be a pouch-shaped case constructed in a structure in which a receiving part for receiving the electrode assembly is formed in an aluminum laminate sheet. After the electrode assembly is mounted in the receiving part, the cell case made of the laminate sheet is sealed, for example, by thermal welding.

Preferably, the battery cell according to the present invention is a lithium secondary battery. Especially, the present invention is particularly applied to a secondary battery having an electrode assembly impregnated with a lithium-containing electrolyte in the form of a gel, a so-called a lithium ion polymer battery.

In accordance with another aspect of the present invention, there is provided a battery pack including the battery cell mounted in a pack case.

Generally, the battery cell is used in the form of a battery pack constructed in a structure in which the battery cell is mounted in a pack case so as to increase the mechanical strength of a cell case of the battery cell and to stably locate various elements at the outside of the battery cell.

The long and concave groove formed in the outer surface of the battery cell provides a predetermined gap when the outer surface of the battery cell is brought into contact with the inner surface of the pack case. This gap may be used as a coolant flow channel to assist the dissipation of heat from the battery cell.

In a preferred embodiment, the inner surface of the pack case is constructed in a structure corresponding to the small groove of the battery cell so as to reduce a possibility that a short circuit occurs due to the movement of the battery cell in the pack case. Specifically, it is possible to increase the contact force between the battery cell and the pack case by forming a small protrusion corresponding to the small groove of the battery cell at the inner surface of the pack case. In this case, the small protrusion formed at the inner surface of the pack case is engaged in the small groove formed in the outer surface of the battery cell, whereby the stable attachment of the battery cell to the pack case is guaranteed when an external force is applied to the battery pack.

When the small groove is formed at a predetermined region of the cell case corresponding to the lower end interface of the electrode assembly, the small protrusion may also be formed at the inner surface of the pack case such that the small protrusion corresponds to the small groove.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
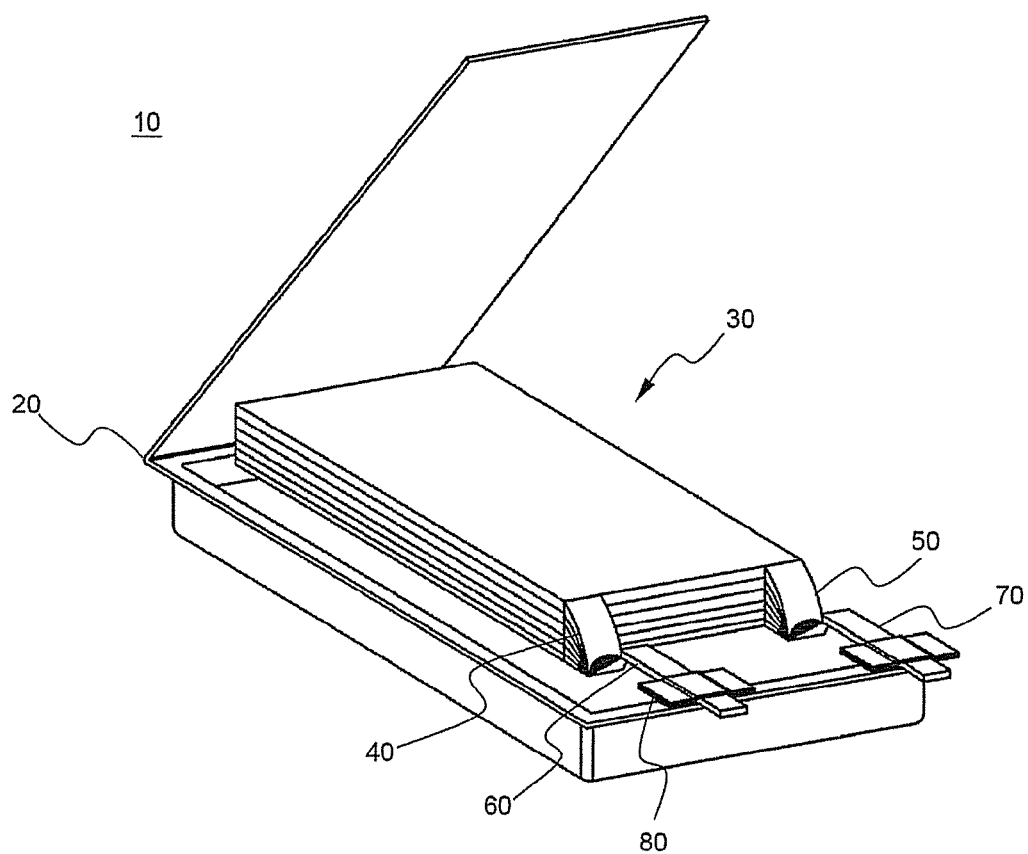
FIG. 1 is an exploded perspective view illustrating the general structure of a conventional pouch-shaped secondary battery.
Figure 2:
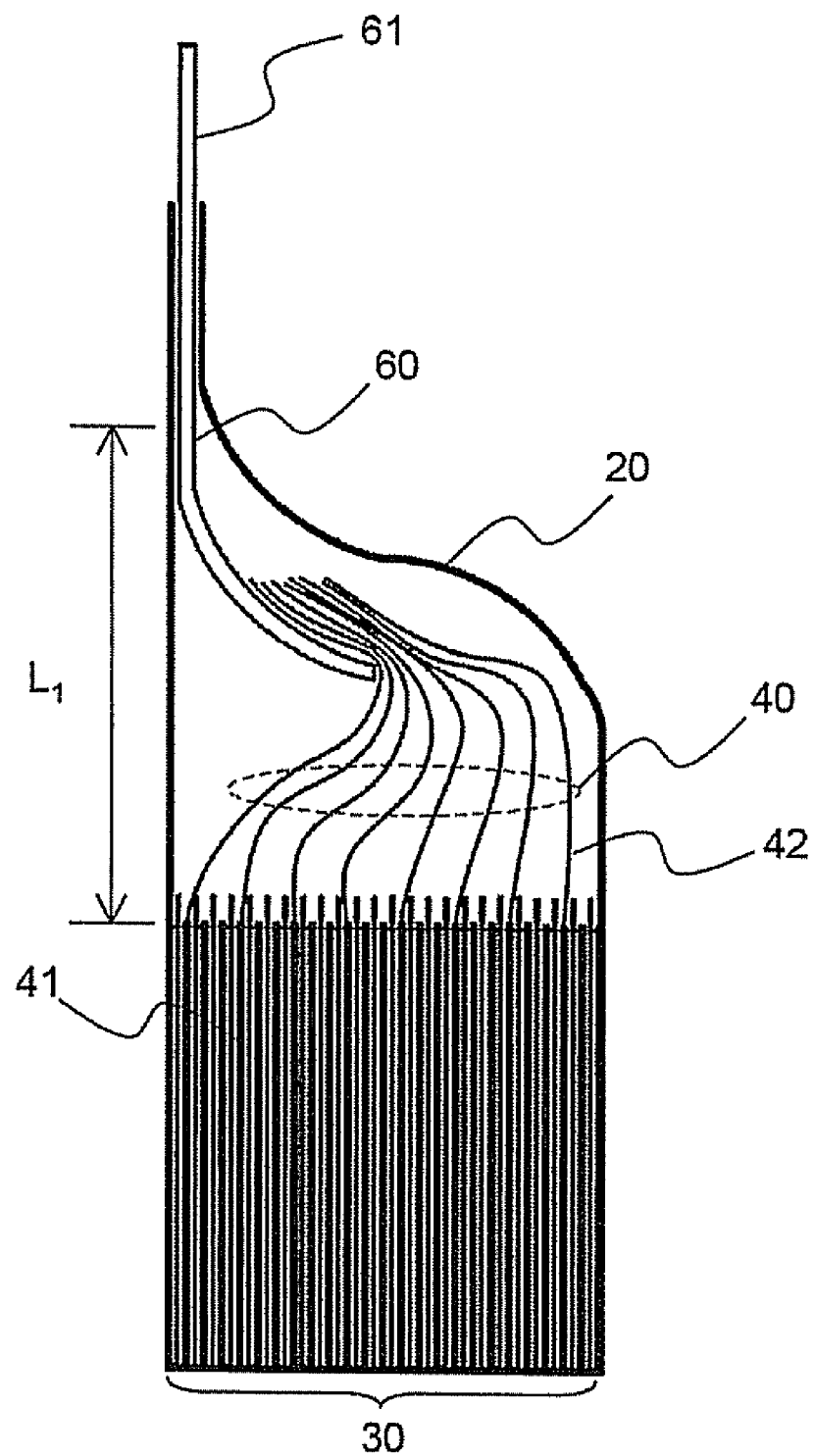
FIG. 2 is an enlarged view, in section, illustrating the inner upper end of a battery case of the secondary battery shown in FIG. 1, in which cathode taps are coupled to each other in a concentrated state and connected to a cathode lead.
Figure 3:
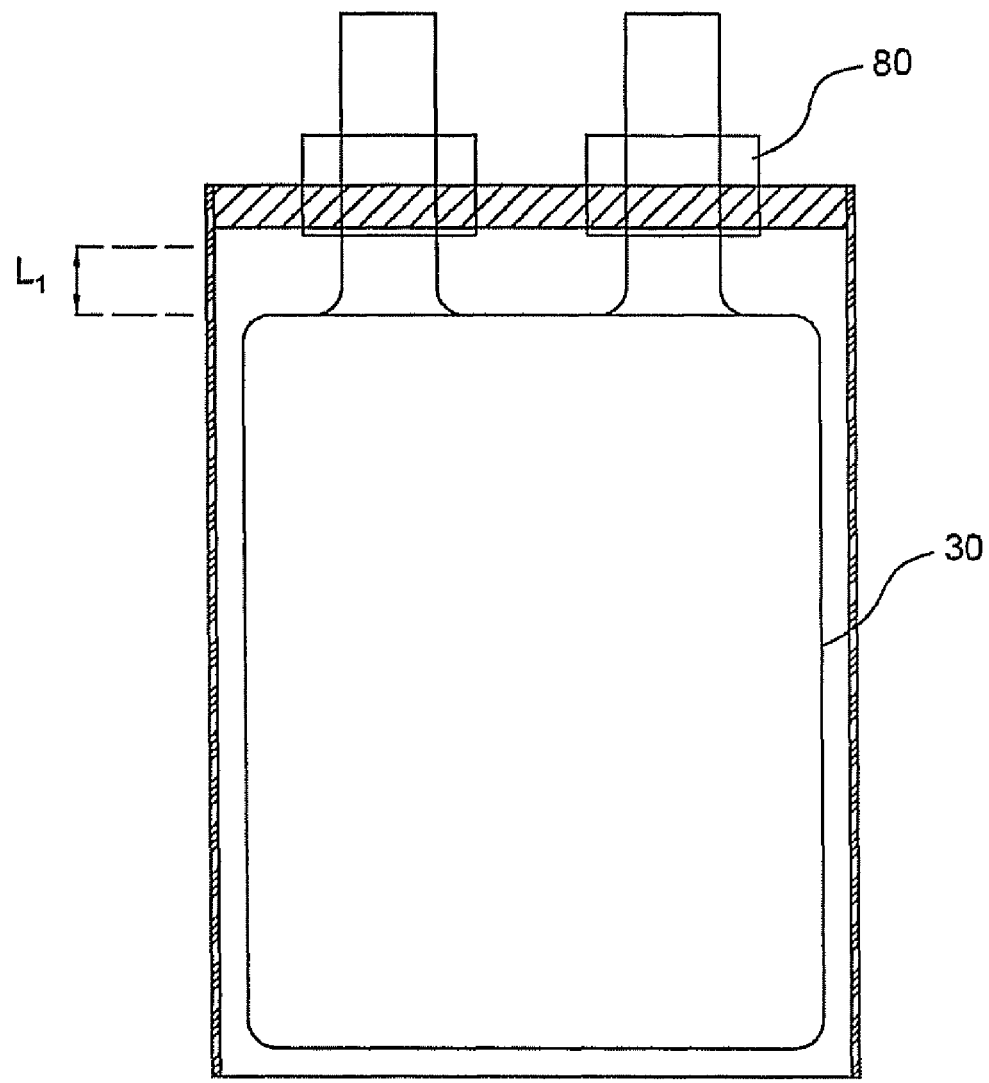
FIG. 3 is a front see-through view illustrating the secondary battery of FIG. 1 in an assembled state.
Figure 4:
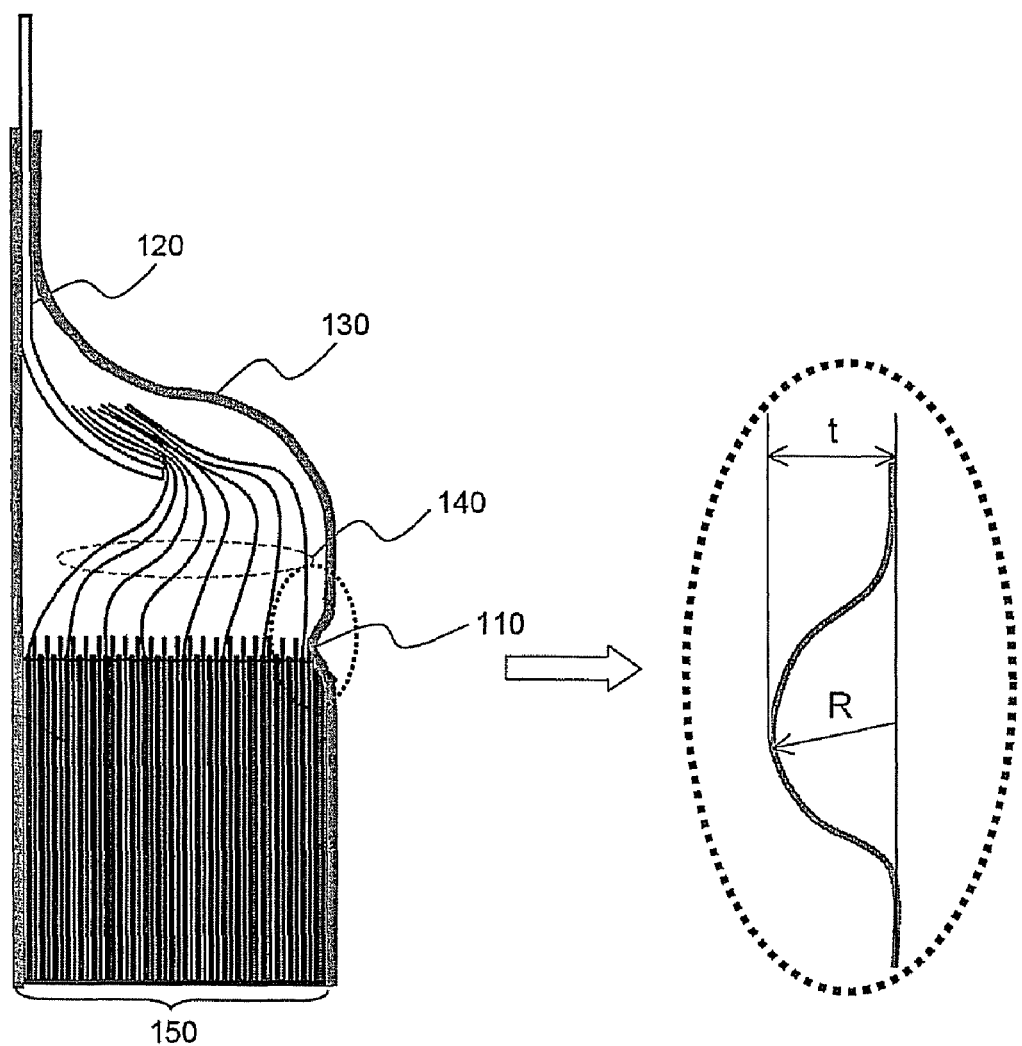
FIG. 4 is an enlarged view, in section, illustrating the inner upper end of a battery case of a secondary battery according to a preferred embodiment of the present invention, in which cathode taps are coupled to each other in a concentrated state and connected to a cathode lead.
Figure 5:
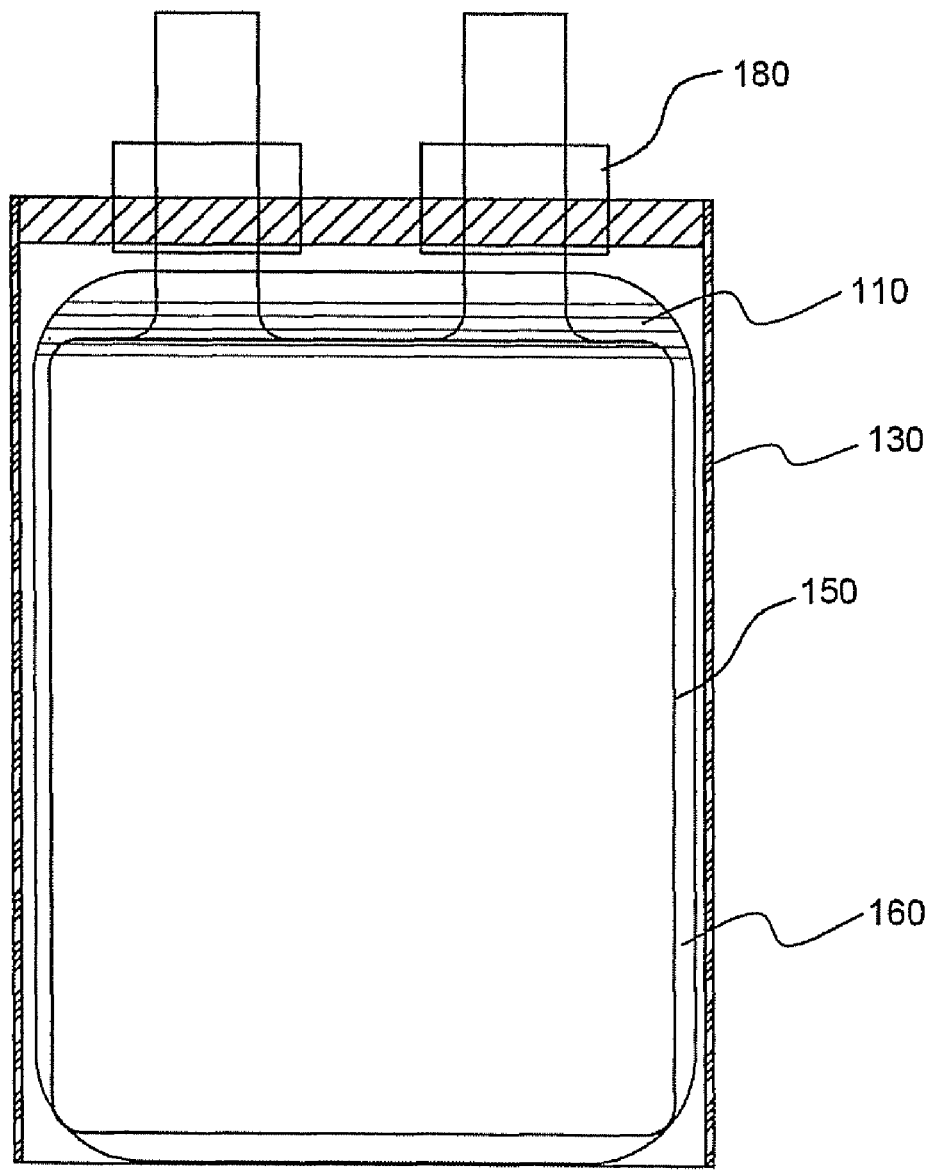
FIG. 5 is a front see-through view illustrating a secondary battery according to a preferred embodiment of the present invention in an assembled state.

FIG. 4 is an enlarged view, in section, illustrating the inner upper end of a battery case of a secondary battery according to a preferred embodiment of the present invention, in which cathode taps are coupled to each other in a concentrated state and connected to a cathode lead, and FIG. 5 is a front see-through view illustrating a secondary battery constructed in a structure in which a small groove are formed in a predetermined region of the battery case corresponding to the upper end interface of the electrode assembly.

Referring to these drawings, the pouch-shaped secondary battery includes an electrode assembly 150 having electrode taps 140 welded to electrode leads 120, a battery case 130 for receiving the electrode assembly 150, a small groove 110 formed in a predetermined region of the battery case 130 corresponding to the interface between the upper end of the electrode assembly 150 and the electrode taps 140.

The small groove 110 is continuously formed in parallel with the upper end of the electrode assembly 150 at the region of the battery case 130 corresponding to the upper end interface of the electrode assembly 150, while the electrode assembly 150 is mounted in a receiving part 160 of the battery case 130, such that the small groove 110 presses against the upper end of the electrode assembly 150.

The small groove 110 is constructed approximately in a semicircular depression structure having a radius of curvature R of 0.5 mm or more in vertical section. Also, the small groove 110 has a depth of 0.5 to 1.5 mm.

The electrode assembly 150 is stably maintained in position at a predetermined region of the battery case 130 by virtue of the small groove 110. Consequently, when the battery drops with the electrode leads 120 down or when an external force is applied to the electrode leads 120 of the electrode assembly 150, the small groove 110 restrains the upward movement of the electrode taps 140 in the battery case 130 to prevent the occurrence of a short circuit between the electrode taps 140 and the electrode leads 120. In addition, the surface area of the battery case 130 is increased by the small groove 110, and therefore, the heat dissipation characteristics of the secondary battery are improved.

Figure 6:
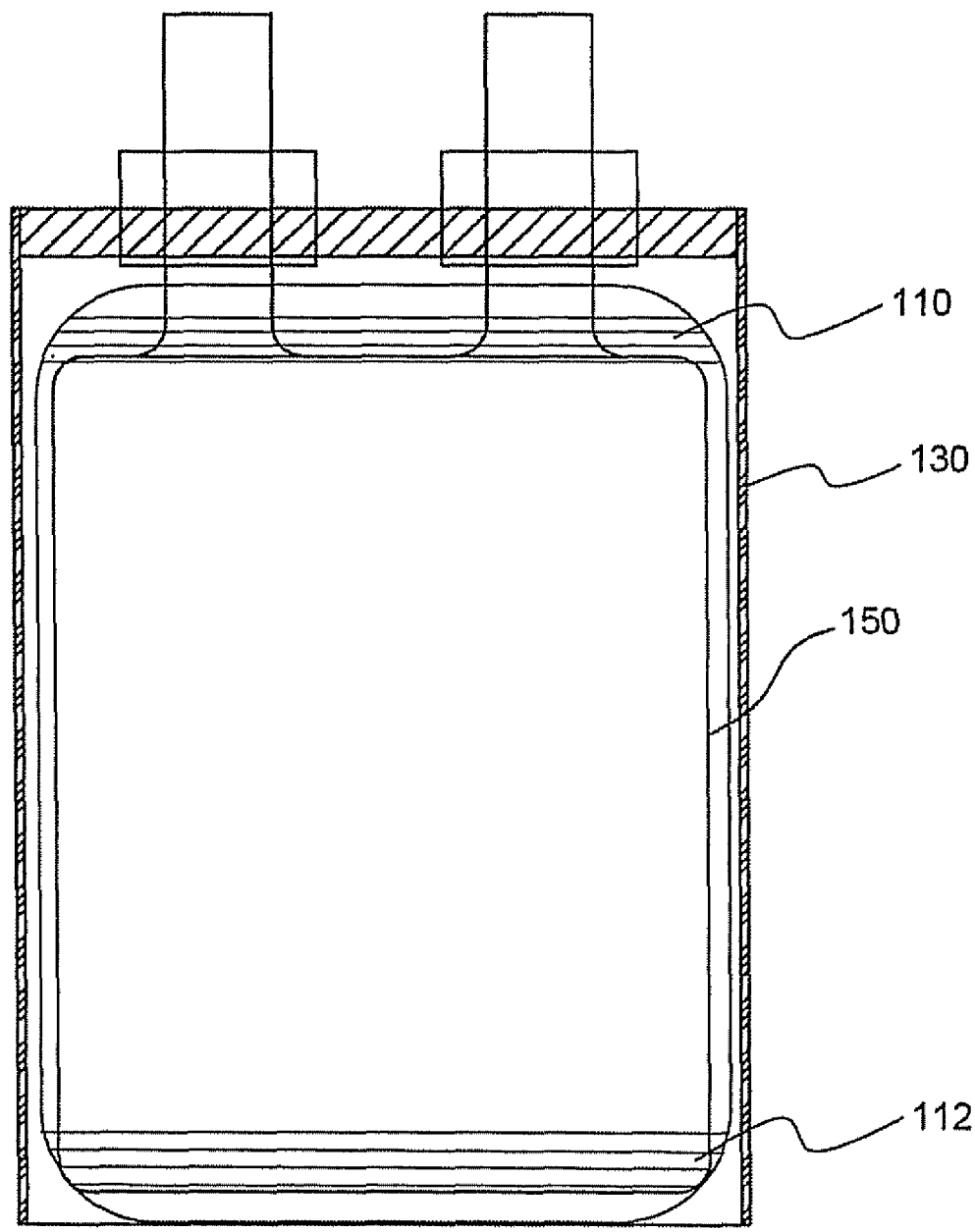
FIG. 6 is a front see-through view illustrating a secondary battery according to another preferred embodiment of the present invention in an assembled state.

According to circumstances, as shown in FIG. 6, another small groove 112 may be also continuously formed in parallel with the lower end of the electrode assembly 150 at a predetermined region of the battery case 130 corresponding to the lower end interface of the electrode assembly 150. In this case, the electrode assembly 150 is more stably fixed in the battery case 130 through the cooperation of the upper-end small groove 110 and the lower-end small groove 112.

Figure 7:
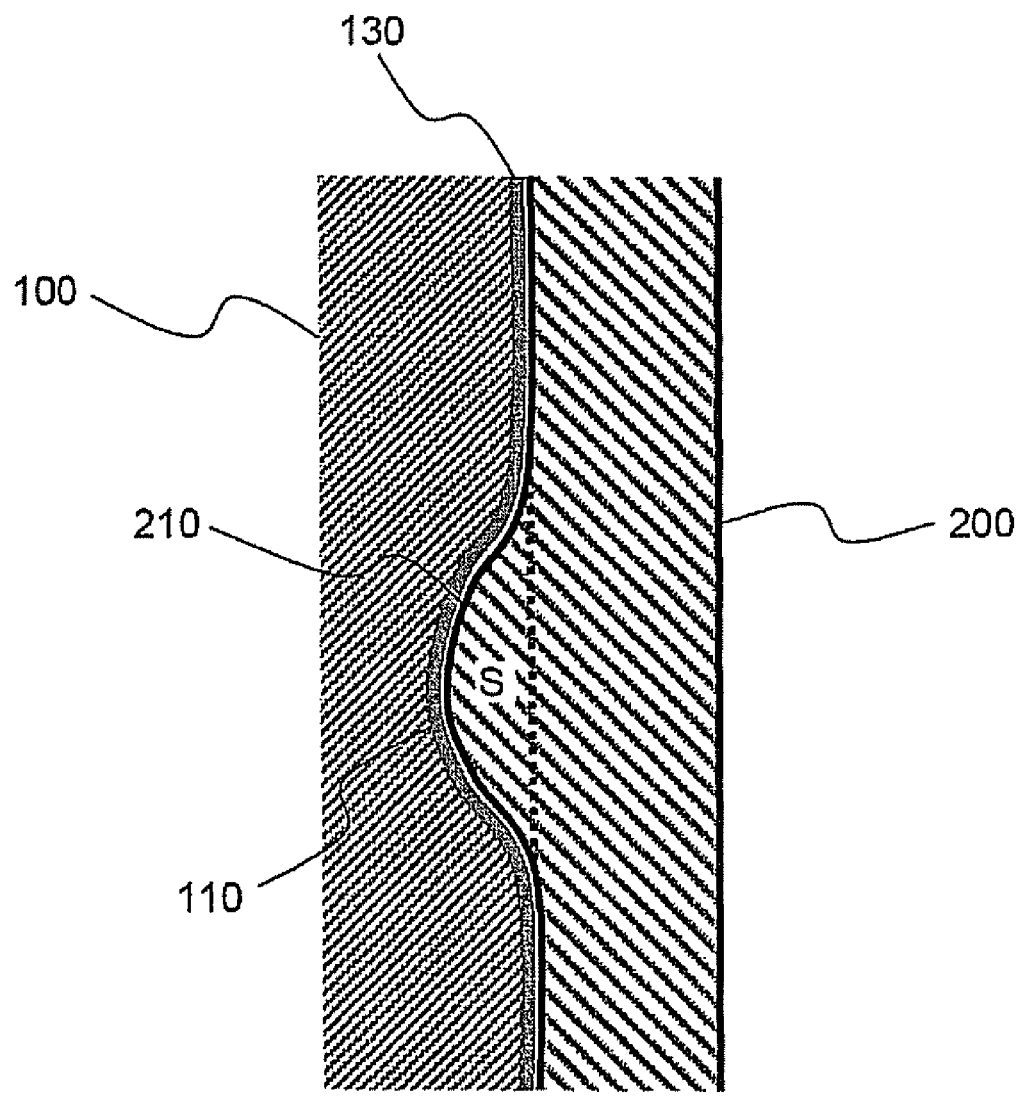
FIG. 7 is an enlarged view, in section, illustrating the contact region between a battery cell having a small groove formed therein and a pack case in a battery pack according to a preferred embodiment of the present invention.

FIG. 7 is an enlarged view, in section, illustrating the contact region between a battery cell 100 having a small groove formed therein and a pack case 200 in a battery pack according to a preferred embodiment of the present invention.

Referring to FIG. 7, the battery cell 100 has a small groove 110 formed at a predetermined region of a battery case 130 as previously described, and the pack case 200 is provided with a small protrusion 210 corresponding to the small groove 110. When an external force is applied to the battery pack, the battery cell remains stably fixed in the pack case through the engagement between the small groove 110 of the battery cell 100 and the small protrusion 210 of the pack case 200.

In a case that the small protrusion 210 is not formed at the pack case 200, the battery cell 100 has a predetermined gap S defined between the battery cell 100 and the pack case 210 due to the small groove 110. The gap S is used as a kind of coolant flow channel to assist the dissipation of heat from the battery cell 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the battery cell according to the present invention has the effect of restraining the upward movement of the electrode taps to prevent the occurrence of an internal short circuit of the battery cell when the battery cell drops or when external impact are applied to the battery cell, whereby the safety of the battery cell is further improved.

What is claimed is:

1. A battery pack comprising a battery cell including an electrode assembly of a cathode/separator/anode structure mounted in a receiving part of a cell case, wherein
the cell case that is made of a laminate sheet including a resin layer and a metal layer is provided, at a predetermined region of the cell case corresponding to an upper end interface of the electrode assembly while the electrode assembly is mounted in a receiving part, with a small groove pressing against the upper end of the electrode assembly and fixing the electrode assembly with respect to the receiving part to prevent an upward movement of the electrode assembly, the small groove disposed in parallel with the upper end of the electrode assembly,
wherein an inner surface of the cell case is protruded toward the upper end interface of the electrode assembly to form the small groove, and
wherein the small groove has a depth of 0.5 to 1.5 mm, and
wherein the inner surface of the pack case is constructed in a structure corresponding to a small groove of the battery cell.

2. The battery pack according to claim 1, wherein the cell case is also provided, at a predetermined region of the cell case corresponding to the lower end interface of the electrode assembly while the electrode assembly is mounted in the receiving part, with another small groove such that the small groove is continuously formed in parallel with the lower end of the electrode assembly.

3. The battery pack according to claim 1, wherein the small groove is constructed in a semicircular depression structure in vertical section.

4. The battery pack according to claim 3, wherein the small groove of the semicircular depression structure has a radius of curvature R of 0.3 to 3 mm.

5. The battery pack according to claim 1, wherein the battery cell is a lithium secondary battery.

* * * * *